(12) United States Patent
Kemink

(10) Patent No.: US 7,574,693 B1
(45) Date of Patent: Aug. 11, 2009

(54) INTERNET-BASED SERVICE FOR UPDATING A PROGRAMMABLE CONTROL DEVICE

(75) Inventor: Joost Kemink, Campbell, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/311,128

(22) Filed: May 13, 1999

Related U.S. Application Data

(60) Provisional application No. 60/100,826, filed on Sep. 17, 1998.

(51) Int. Cl.
G06F 9/44 (2006.01)
G06F 9/445 (2006.01)
G06F 15/16 (2006.01)

(52) U.S. Cl. .............. 717/121; 717/120; 717/122; 717/168; 717/174; 709/218

(58) Field of Classification Search ......... 345/716–866; 717/120–123, 168–178; 709/217–219; 341/173–178; 715/513–516
See application file for complete search history.

(56) References Cited

U.S. PATENT DOCUMENTS

| | | | | |
|---|---|---|---|---|
| 5,410,326 A * | 4/1995 | Goldstein | .................. | 348/734 |
| 6,049,671 A * | 4/2000 | Slivka et al. | ................ | 717/173 |
| 6,075,528 A * | 6/2000 | Curtis | ....................... | 345/866 |
| 6,198,479 B1 * | 3/2001 | Humpleman et al. | ........ | 715/733 |
| 6,208,341 B1 * | 3/2001 | van Ee et al. | ................ | 345/716 |
| 6,211,856 B1 * | 4/2001 | Choi et al. | .................. | 345/666 |
| 6,256,668 B1 * | 7/2001 | Slivka et al. | ................ | 709/220 |
| 6,317,143 B1 * | 11/2001 | Wugofski | ................... | 345/765 |
| 6,408,435 B1 * | 6/2002 | Sato | .......................... | 725/58 |
| 6,466,203 B2 * | 10/2002 | Van Ee | ....................... | 345/173 |
| 6,466,233 B1 * | 10/2002 | Mitani | ........................ | 345/716 |
| 6,476,825 B1 * | 11/2002 | Croy et al. | .................. | 345/716 |
| 6,568,595 B1 * | 5/2003 | Russell et al. | .......... | 235/462.01 |
| 7,218,243 B2 * | 5/2007 | Hayes et al. | .......... | 340/825.72 |

FOREIGN PATENT DOCUMENTS

EP 0626635 A2 11/1994
EP 0862304 A2 9/1998

* cited by examiner

*Primary Examiner*—Lewis A Bullock, Jr.
*Assistant Examiner*—Jason Mitchell

(57) ABSTRACT

An Internet based service is provided for updating a programmable control device. An Internet site contains links to appliance-dependent control and feature option information which can be downloaded to the programmable control as a graphic user interface (GUI). A user interface is provided at the site for the user to easily specify a target appliance, and thereafter selectively download the interface and control information that is available for the target appliance. The Internet site also contains links to other providers of configurations and macros, such as system integrators who provide interfaces based on an inventory of the user's controllable equipment, hobbyist who share configurations and macros that they've found useful, and so on.

10 Claims, 3 Drawing Sheets

INTERNET-BASED SERVICE FOR UPDATING A PROGRAMMABLE CONTROL DEVICE

This application claims the benefit of U.S. Provisional Application No. 60/100,826, filed Sep. 17, 1998.

BACKGROUND OF THE INVENTION

1. Field of the Invention

This invention relates to the field of consumer electronics, and in particular to devices having a programmable graphics user interface, such as programmable remote control devices, telephones, household appliances, and the like.

2. Description of Related Art

Ever increasingly more sophisticated electronic audio/video (AV) equipment and home automation equipment are being introduced on the consumer electronics (CE) market. Typically, the equipment is programmable by the end-user in order to tailor the numerous functionalities and settings to the individual preferences. The user-interactivity and synergy aspects of the equipment are determined substantially by software such as interactive applications, control software and user interfaces. See, for example, the HAVi architecture and the Home API initiative, both involving substantial contributions from Philips Electronics, the Jini technology of Sun Microsystems, Inc., etc.

A step forward in user-friendliness regarding interacting with the equipment is the universal programmable remote controller, such as the "RC-2000" of Marantz and the "Pronto" made by Philips Electronics. The term "universal remote" refers to a device that enables the end-user to control the majority of his/her collection of remotely controllable apparatus, regardless of the type or brand of the individual apparatus. This universal controllability is achieved by accommodating on the remote a data base of multiple sets of existing control (IR or RF) codes, each particular set being associated with a particular type of apparatus of a particular brand. In addition, the universal remote is programmable to learn or adopt new codes and to associate them with a particular user-defined input. The "Pronto", for example, has built-in RC-5 and RC-6 codes for Philips and Marantz equipment, IR-sending and IR-learning eyes, and an RS232 serial port connector for after-market expandability, e.g., via a PC.

As the advantages of programmable control are realized, the market demand for programmable control can be expected to result in programmable graphic user interfaces on devices other than remote controllers. For example, consumers may find that the conventional numeric key pad on a telephone device is antiquated in light of new communications means and dialing options provided by their communications service provider. Some consumers may prefer only two options to appear on their washing machine: "white wash" or "color wash", wherein each selectable option is preprogrammed to provide the appropriate wash duration, water temperature, cool down cycle, and so on. In like manner, common settings for a microwave oven can be preprogrammed and presented on a control panel that is customized for a particular user.

OBJECT OF THE INVENTION

The customization capability of programmable user interfaces raises the issue of user-friendliness regarding controllability, reliability and accessability, as well as the user-friendliness of the user-programmability. How technically sophisticated the equipment may be, it will be of little use to the consumer if he/she cannot get it to do what he/she wants it to do and when he/she wants it be done.

FIG. 1 illustrates an example programmable remote control 100 similar to the "Pronto". The remote control 100 provides a graphic user interface (GUI) via an LCD touch screen 110 and also has direct-access buttons 120 for frequently used control functions. Typically, the remote control 100 includes customizable device templates for full control of the device being controlled. For example, the remote control 100 comprises one or more templates for the GUI that contains illustrations or icons of the controls typically found on a playback device such as a DVD, including a play button icon 131, fast forward 132, go to end 133, stop 134, and so on. The user merely touches the icon 131-134 on the LCD touch screen 110 to effect the desired function. Also illustrated on the LCD touch screen 110 is an icon 141 to switch to another related device, such as a TV, and an icon 142 to switch to an index of controllable devices and function.

An advanced programmable remote control 100 such as the "Pronto" also provides options to assign control functions to icons or buttons; options to delete and create icons or buttons; to program and edit macros; a keyboard with soft keys for (re-) labeling buttons, icons and templates or the GUI's control panels. For example, a user may desire some of the control options for the television, such as volume control, to be displayed on the LCD touch screen 110 whenever the controls 131-134 of the example DVD are displayed. Different users of the control device 100 in the same household may each prefer a different layout for the same device. To accommodate such preferences, programmable control devices such as the "Pronto" are highly customizable in terms of the layout, appearance, labeling, organization and in terms of programming and editing the control functions. As the use of graphic user interfaces becomes commonplace, the availability of programmable graphic user interfaces on other devices, such as telephones, hand-held radios, household appliances, navigation devices, and so on, can be expected to also become commonplace.

An ergonomically designed programmable control, such as the "Pronto" remote controller for example, may help to lower the acceptance-threshold for home theater and home automation systems, owing to the controller's user-friendliness, personalizing options and wide applicability, but many capabilities of the programmable control system may go unused if the consumer is reluctant to program the device, or if the programming of the device is perceived as a daunting task. Similarly, the synergistic aspects of a programmable control system may also go unused if the user is not aware of, or sensitive to, the possibility of such synergy. That is, a cluster of appliances may be synergistically controlled so as to enhance a sense of being embedded in the experience. The playback of a DVD movie, for example, may be enhanced by enabling surround sound on the user's audio appliance, dimming the lights in the room where the user's television is located, and placing the user's telephone in an auto-answer mode.

The capabilities of the programmable control system may also go unused if the capabilities of the device being controlled, herein termed the appliance, are difficult to obtain or the commands that effect the control of the appliance are difficult to map to the available capabilities of the programmable control. To ease the programming task, the Pronto system includes an infrared (IR) receiver that receives the appliance commands from a remote control device that is specific to the appliance. This feature, however, presupposes that an appliance-specific remote control device will continue to be provided with each remotely controllable appliance. As programmable remote controls such as Pronto become prolific, the need for packaging an appliance-specific remote control device with each appliance becomes questionable. As is becoming increasingly common, the appliance-specific remote control devices are typically used once by the consumer to program a common programmable remote control, then stored or tossed away.

As noted above, the programmable control device exemplified by Pronto includes a configuration capability, wherein the user-interface is designed for all the appliance-specific controls, macro groups, GUI panel layouts, button appearances and behaviors, and so on. Copending U.S. patent application "FULLY FUNCTIONAL REMOTE CONTROL EDITOR AND EMULATOR", U.S. Ser. No. 09/271,200, filed Mar. 17, 1999 for Jan van Ee, and incorporated by reference herein, points out the difficulty of developing an effective configuration, particularly when the only means for testing and verifying the configuration is to actually apply the configuration to the device. This referenced application discloses the use of an editor and emulator to develop and test configurations and command sequences on a personal computer, for subsequent download to the programmable control device after the configuration is verified, via emulation. It is expected that the use of this referenced invention will result in a rapid development of many useful appliance-specific macros. As programmable remote devices such as "Pronto" become increasingly popular, manufacturers are likely to develop macros and Graphic user interfaces that enhance the ease of use of their products, the appeal of their products, and, through interaction with other devices, enhance the apparent capabilities of their products. In like manner, as programmable control is provided for devices other than remote control devices, such as telephones, household appliances, and the like, it is expected that the vendors of these devices will provide optional appliance-specific macros and configurations as well.

It is an object of this invention to ease the task of programming a programmable control device, and in particular a device having a graphic user interface. It is a further object of this invention to provide a means for accessing and downloading graphic user interfaces corresponding to appliances that are included in a user's inventory of controllable appliances. It is a further object of this invention to provide a means for accessing and downloading graphic user interfaces that provides for the synergistic control of the user's inventory of controllable appliances.

BRIEF SUMMARY OF THE INVENTION

These objects and others are achieved by providing an Internet based service for updating the graphic user interface of a programmable control device. An Internet site contains links to appliance-dependent control and feature option information which can be downloaded to the programmable control as a graphic user interface (GUI). The graphic user interface includes, for example, selectable buttons, icons, clusters of icons, templates, and the like that enhance the control of one or more user appliances. The Internet site allows the user to easily specify a target appliance, or collection of appliances, and thereafter selectively download one or more graphic user interfaces that are available for the target appliance, the collection of appliances, or an environment that includes one or more of the appliances. The Internet site also contains links to other providers of graphic user interfaces, such as system integrators who provide configurations and macros based on an inventory of the user's controllable equipment, hobbyist who share configurations and macros that they've found useful, and so on.

BRIEF DESCRIPTION OF THE DRAWINGS

The invention is explained in further detail, and by way of example, with reference to the accompanying drawings wherein.

DETAILED DESCRIPTION OF THE INVENTION

Figure 2:
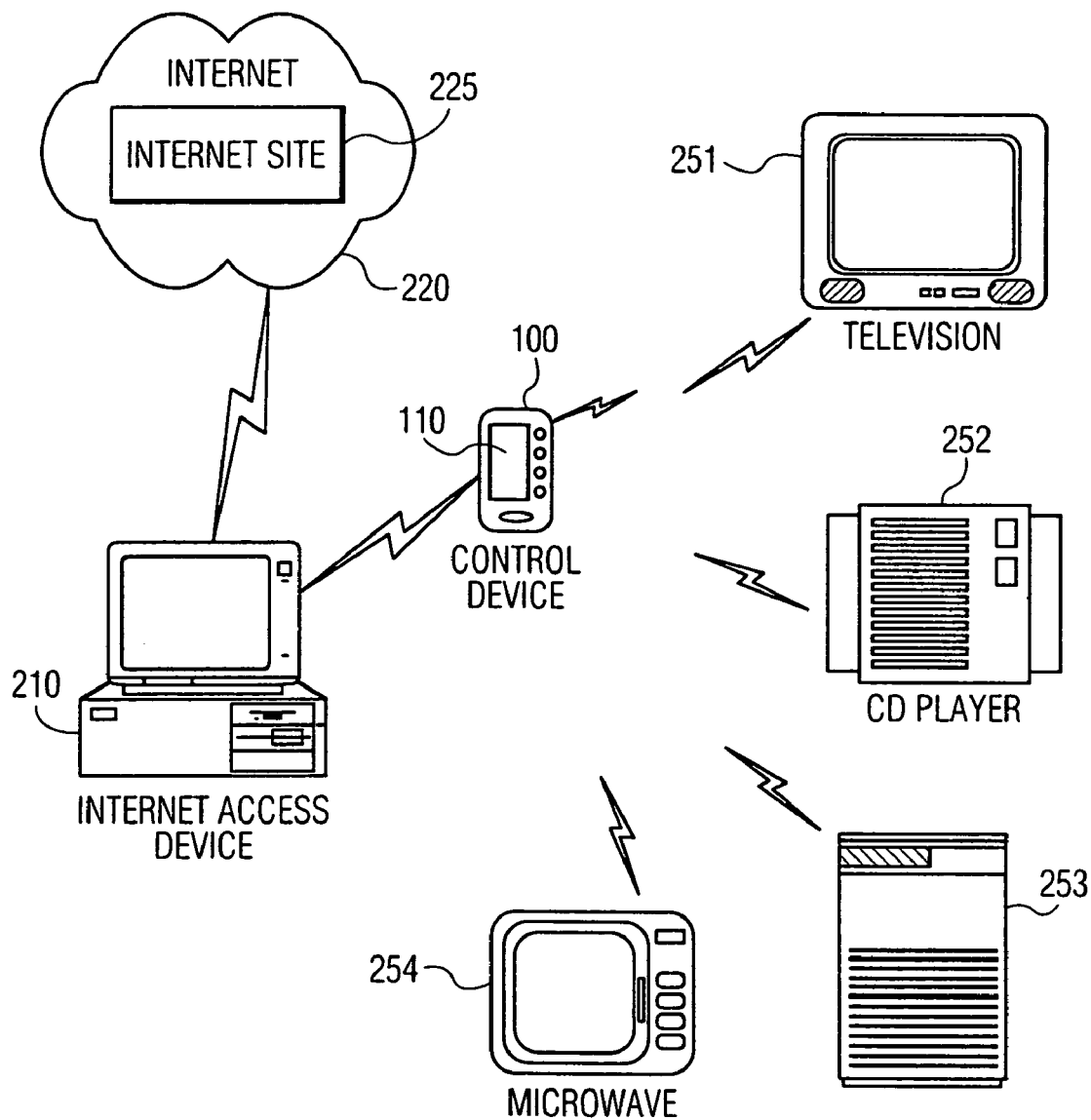
FIG. 2 illustrates an example block diagram of an Internet-based service for updating a programmable control device in accordance with this invention.

FIG. 2 illustrates an example block diagram of an Internet-based service for updating a programmable control device 100 in accordance with this invention. The paradigm of a programmable remote control device 100 is used herein for ease of understanding. As would be evident to one of ordinary skill in the art, the principles embodied herein are applicable to other control devices, such as telephones and other household appliances having a programmable control interface. A user (not shown) accesses the Internet 220 via an Internet access device 210, such as a personal computer (PC). As would be evident to one of ordinary skill in the art, Internet access devices are currently available in other forms, such as set-top boxes, handheld computers, cellular telephones, and the like, and can be expected to migrate to other devices as well, including the control device 100. FIG. 2 also illustrates a variety of appliances 251-254 that are potentially controllable by the remote control device 100; the Internet access device 210 may be included in one or more of the appliances 251-254 as well. As noted above, the programmable control interface may also be located on the appliance 251-254, the paradigm of a remote control being used herein for ease of understanding.

Figure 1:
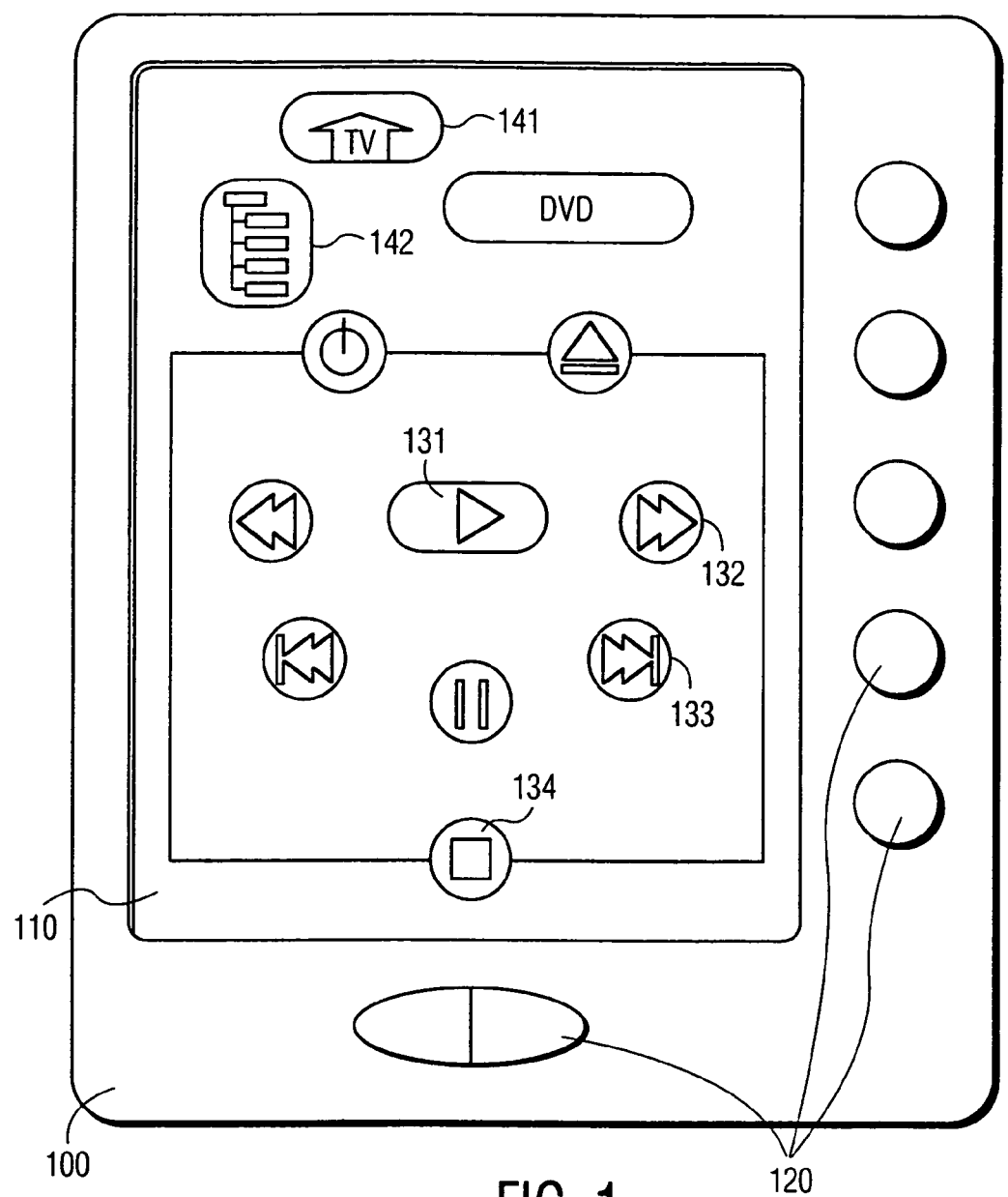
FIG. 1 illustrates an example prior art programmable remote control device.

In accordance with this invention, an Internet site 225 provides a service for obtaining software code for programming the graphic user interface of the control device 100. The software code will generally contain information specific to one or more of the appliances 251-254, but may also contain general purpose information as well, such as code for organizing and presenting information on the display screen 110. The term device control profile is used herein to identify the nature of the graphic user interface, for ease of reference, although the profile or code need not be appliance specific. The software code is downloaded and stored at the control device 100, via the Internet access device 210; it may also be stored at the Internet access device 210 for subsequent or interim loading to the control device 100. After receiving the device control profile, the control device 100 is able to display the graphic user interface corresponding to the profile. If the profile is appliance specific, the appliance commands to effect the control illustrated by the graphic user interface may also be communicated to the control device 100, to facilitate control of the appliance 251-254 or appliances corresponding to the downloaded code, as discussed with regard to FIG. 1. For example, the service at the Internet site 225 will display, via the Internet Access device 210, a list of appliances that have corresponding graphic user interface code, and prompt the user for a selection. As is common in the art, the user may be led through a sequence of links and web pages until a manufacturer's model number is found that corresponds, for example, to the television 251 in FIG. 2. The user may also be presented a plurality of graphic user interfaces corresponding to the selected appliance and is given a choice among them. The selected graphic interface code is thereafter downloaded to the control device 100. Ancillary information may also be downloaded. For example, in the example of a remote control device 100 such as the "Pronto", the sequence used by the infrared transmitter of the remote control device 100 to effect each appliance control may also be downloaded.

The Internet site 225, or sites, may be provided by the vendor of a remote control device 100, to provide added perceived value to its product; or by one or more vendors of the appliances 251-254 that can be controlled by the remote control device or by a control device contained within the appliance, to provide added perceived value and ease of use to their products; or by a third party that provides the service in return for revenue from advertisers on the site. Particularly in the case of appliance vendors and third parties, the site 225 may provide differing versions of code corresponding to the device control profile, depending upon the type of control device 100. That is, for example, different remote control device manufacturers may employ different commands and protocols to program their remote control devices, or different models of control devices from the same manufacturer may have different characteristics and capabilities. In a preferred embodiment, the site 225 is configured to provide the appropriate code to the particular model of control device 100. As would be evident to one of ordinary skill in the art, although the Internet site 225 is illustrated in FIG. 2 as a single site, the site 225 will typically include links to multiple other sites, such as vendor-specific sites, system-integrator sites, and the like.

Figure 3:
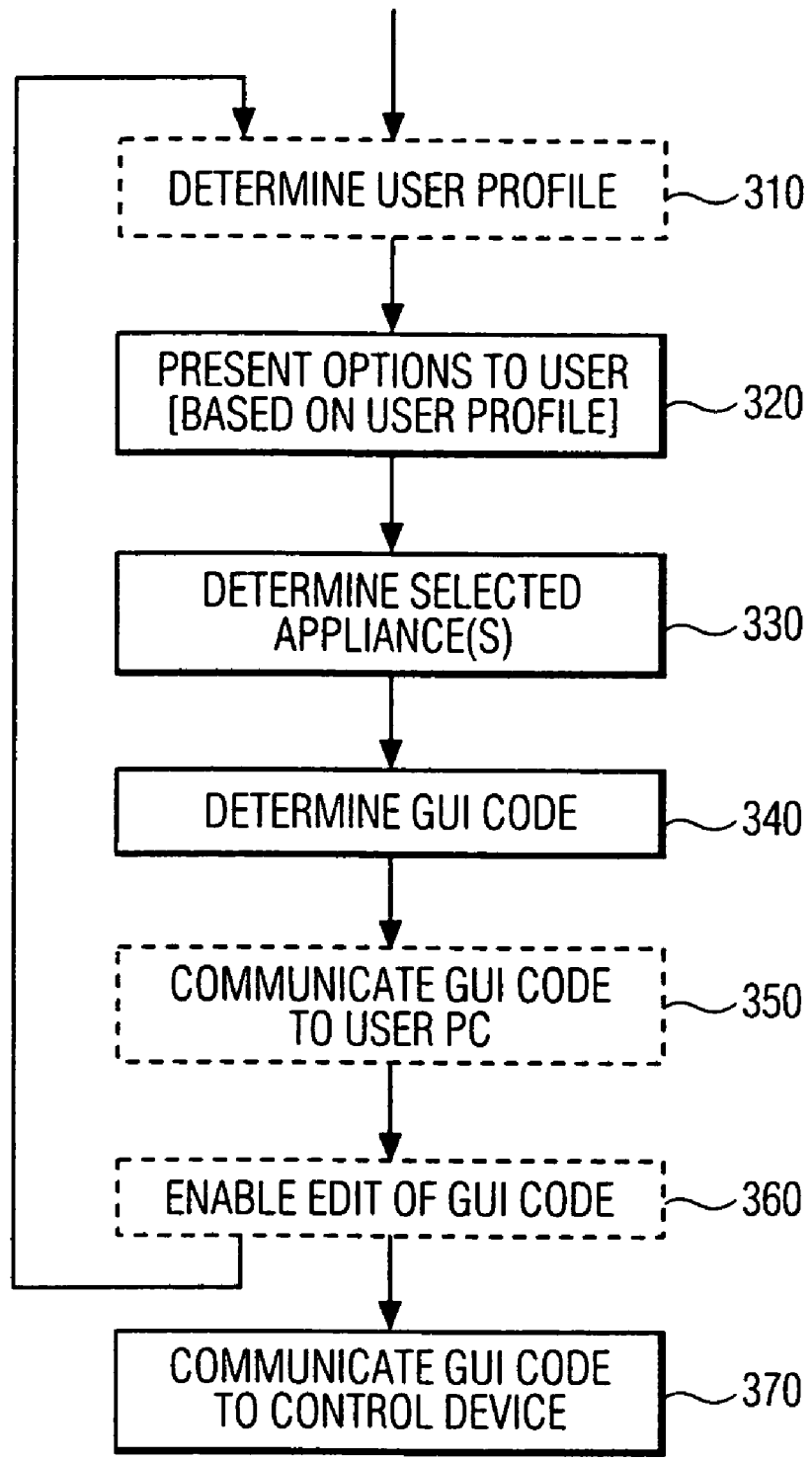
FIG. 3 illustrates an example flow diagram of an Internet-based service for updating a programmable control device in accordance with this invention.

FIG. 3 illustrates an example flow diagram of an Internet-based service for updating a programmable control device in accordance with this invention. Illustrated in FIG. 3 is an optional block 310 for determining a user profile. Copending U.S. patent application "CUSTOMIZED UPGRADING OF INTERNET-ENABLED DEVICES BASED ON USER-PROFILE", U.S. Ser. No. 09/160,490, filed Sep. 25, 1998 for Adrian Turner et al., presents a server system that maintains a user profile of a particular end-user of consumer electronics network-enabled equipment, and a data base of new technical features for this equipment, and is incorporated by reference herein. Copending U.S. patent application, "UPGRADING OF SYNERGETIC ASPECTS OF HOME NETWORKS", U.S. Ser. No. 09/189,535, filed Nov. 10, 1998 for Yevgeniy Shteyn, incorporated by reference herein, presents a system with a server that has access to an inventory of devices and capabilities on a user's home network. The inventory is, for example, a look-up service as provided by HAVi, JINI and Home API architectures. The server also has access to a data base with information of features for a network. The server determines if the synergy of the apparatus present on the user's network can be enhanced based on the listing of the inventory and on the user's profile. If there are features that are relevant to the synergy, based on these criteria, the user is notified. In accordance with this invention, upon notification of newly added features, or the potential for synergistic enhancement, the user is provided the option to select and download graphic user interfaces related to these new features and enhancements.

Using the techniques presented in the aforementioned copending applications, or other techniques common in the art, such as an interactive query session, the options presented to the user at block 320 can be customized for the particular user. Differing graphic user interfaces may also be provided in dependence upon demographics. For example, the GUI code may differ for the same appliance in dependence upon the age of the user. Alternatively, if a user profile is not provided, block 320 is configured to present all of the options for downloading graphic user interface code from the Internet. Using techniques common in the art, discussed above, the service in accordance with this invention determines the graphic user interface code suitable to the user's request and suitable to the user's particular control device.

Illustrated in FIG. 3, the selection sequence is typically effected by a determination of a particular appliance, at 330, and thereafter a determination of the corresponding GUI code, at 340. As noted above, the graphic user interface code is not necessarily limited to appliance specific code, and alternative means for determining the appropriate GUI code corresponding to the user's desires will be evident to one of ordinary skill in the art in the light of this disclosure.

Illustrated in FIG. 3 is optional block 350 that communicates the GUI code to the Internet access device, prior to downloading to the control device, at 370. Depending upon the configuration of the Internet access device, the GUI code may be downloaded to the Internet access device, and then transferred to the control device, or the GUI code may be routed directly to the control device. Block 360 is an optional block that facilitates a user modification of the GUI code prior to downloading to the control device, at 370. In this optional embodiment, the user may, for example, choose a different layout of the icons that are included in the GUI code, or choose to delete some of the icons, or choose to combine the downloaded GUI code with other GUI code. The aforementioned copending U.S. patent application "FULLY FUNCTIONAL REMOTE CONTROL EDITOR AND EMULATOR", U.S. Ser. No. 09/271,200, filed Mar. 17, 1999 for Jan van Ee, is utilized in a preferred embodiment to effect and verify such changes. Alternatively, the GUI code may be modified on the control device, using for example the techniques presented in copending U.S. patent application "GUI OF REMOTE CONTROL FACILITATES USER-FRIENDLY EDITING OF MACROS", U.S. Ser. No. 09/129,300, filed Aug. 5, 1998 for Jan van Ee, and incorporated by reference herein.

The user is also provided the option of repeating the above sequence for additional downloads of GUI code, as indicated by the dashed line to block 310. After the GUI code is downloaded to the control device, at 370, the user may utilize the GUI corresponding to the code to control the selected appliance. As discussed above, the download process may also include a download of other information related to a remote control device and/or the selected appliance.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the choice of GUI code for a particular appliance may be dependent upon an inventory of other appliances of the user, or it may be dependent upon the location of the appliance, or the location of the control device. For example, the controls included in the GUI for a DVD player may differ depending upon whether the DVD is used with a conventional television or a high definition television. In like manner the controls included in the GUI for a television may depend upon whether the television is incorporated into a multimedia system, or located in a bedroom, as compared to a family room, and so on. Copending U.S. patent application "REMOTE CONTROL DEVICE WITH LOCATION DEPENDENT INTERFACE", U.S. Ser. No. 09/210,416, filed Dec. 11, 1998 for Joost Kemink, discloses the use of a location determination device to select or modify the user interface in dependence upon the location of a remote control device, and is incorporated by reference herein. In like manner, the controls included in the GUI may differ depending upon the geographic location of the user, using, for example, different language text in different countries. The controls may also be dependent upon a time parameter, such as the time of day, season of the year, and so on.

The structure and configuration are presented in the figures for illustrative purposes, and alternative arrangements would be evident to one of ordinary skill in the art. For example, the aforementioned GUI editing and verification tasks could be effected at the Internet site 225, rather than local to the Internet access device 210 or control device 110. In like manner, the Internet site 225 may provide the GUI information in the form of parametric data, wherein the Internet access device 210 or control device 110 is configured to process the downloaded parametric GUI data to create the corresponding GUI details. For the purposes of this invention, it would be evident to one of ordinary skill in the art that the term GUI code includes such parametric GUI data. In like manner, the control device 110 may upload GUI code, in the form of GUI details, parametric GUI data, and the like, to the Internet access device 210, for processing and modification by the Internet access device 210 based upon downloaded GUI code from the Internet site 225. It is also noted that other devices and systems that perform similar functions could be employed to effect this invention. For example, the use of an Internet site 225 in this disclosure is a paradigm for a general source of information. Other local networks, private networks, and the like could be used to store GUI information at an accessible site, such as a server, for downloading to individual control devices having access to that site. These and other alternative architectures and configurations will be evident to one of ordinary skill in the art, and are included within the scope of the following claims.

I claim:

1. A method to facilitate a programming of a control device that provides a graphic user interface, the method comprising:
    enabling a determination of at least one appliance or collection of appliances for being user-controlled through the control device;
    determining code for graphically representing controllable features of the at least one appliance or collection of appliances on the graphic user interface of the control device, wherein the graphic user interface includes selectable buttons, icons, clusters of icons, and templates that enhance a control of one or more appliance and need not be appliance specific, wherein determining the code includes extracting, as a function of a synergistic control, a device control profile (i) specific to the one or more appliance and (ii) which identifies a nature of the graphic user interface, further in dependence upon at least one of: a location parameter representing a location of the at least one appliance or collection of appliances, a location parameter representing a location of the control device, a location parameter representing a location of a user, a time parameter representing a time of day, a time parameter representing a season of the year, a user profile, and an inventory of appliances of a user; and
    communicating the code to the control device for storage at the control device for enabling user-control of the appliance in response to a subsequent user activation of the control device,
    wherein determining the code further includes accessing an Internet site in dependence upon the determination of the at least one appliance or collection of appliances.

2. The method of claim 1, wherein determining the code includes extracting a device control profile from a plurality of device control profiles for a same appliance, wherein graphic user interface code is further provided in dependence upon demographics.

3. The method of claim 1, further including:
    communicating appliance control commands to the control device to facilitate the user-control of the appliance.

4. The method of claim 1, further including enabling an editing of the code, wherein editing includes one selected from the group consisting of a user choice of different layout of icons included in the communicated graphic user interface code; user deletion of icons in the communicated graphic user interface code; and user combination of the communicated graphic user interface code with other graphic user interface code.

5. The method of claim 1, wherein the determination of at least one appliance includes
    providing a sequence of selection options that lead to the determination of the at least one appliance.

6. The method of claim 1, wherein the at least one appliance comprises at least one of: a television, a CD player, a DVD player, a computer, a set-top box, a telephone, and a microwave.

7. A control device for remotely controlling one or more electronic devices, the control device comprising:
    a programmable user interface, wherein the programmable user interface includes selectable buttons, icons, clusters of icons, and templates that enhance a control of one or more electronic device and need not be electronic device specific, and
    a receiver that receives user interface code from an Internet site storing interface codes for at least one electronic device or plurality of electronic devices, wherein the user interface code is extracted as a function of a synergistic device control profile that is (i) specific to the one or more electronic device and (ii) used to identify a nature of the user interface, further wherein the user interface code is received in dependence upon at least one of: a location parameter representing a location of the at least one electronic device or plurality of electronic devices, a location parameter representing a location of the control device, a location parameter representing a location of a user, a time parameter representing a time of day, a time parameter representing a season of the year, a user profile, and an inventory of electronic devices of a user, still further wherein the user interface code is configurable according to one selected from the group consisting of a user choice of different layout of icons included in the received user interface code; user deletion of icons in the received user interface code; and user combination of the received user interface code with other graphic user interface code,
    wherein a programming of the programmable user interface is facilitated by the user interface code; and
    wherein the user interface code is for graphically representing a controllable feature of the one or more electronic devices on the programmable user interface.

8. The control device of claim 7, further including an Internet access device.

9. The control device of claim 7, wherein the one or more electronic devices comprise one or more of: a television, a CD player, a DVD player, a computer, a set-top box, a telephone, and a microwave.

10. The control device of claim 7, wherein the programmable user interface is programmed to display a plurality of icons used to control at least one of the one or more electronic devices.

* * * * *